United States Patent [19]

Koenck

[11] Patent Number: 5,019,699
[45] Date of Patent: May 28, 1991

[54] HAND-HELD OPTICAL CHARACTER READER WITH MEANS FOR INSTANTANEOUSLY READING INFORMATION FROM A PREDETERMINED AREA AT AN OPTICAL SENSING AREA

[75] Inventor: Steven E. Koenck, Cedar Rapids, Iowa

[73] Assignee: Norand Corporation, Cedar Rapids, Iowa

[21] Appl. No.: 238,701

[22] Filed: Aug. 31, 1988

[51] Int. Cl.$^5$ .............................................. G06K 7/10
[52] U.S. Cl. ................................. 235/472; 235/462; 235/470
[58] Field of Search ............... 356/376; 235/454, 456, 235/462, 472, 460, 470

[56] References Cited

U.S. PATENT DOCUMENTS

| | | | |
|---|---|---|---|
| 3,964,022 | 6/1976 | Martin | 235/472 |
| 3,985,999 | 10/1976 | Yoneyama | 235/472 |
| 4,096,992 | 6/1978 | Nojiri et al. | 235/462 |
| 4,160,902 | 7/1979 | van Wijngaarden | 235/462 |
| 4,282,425 | 8/1981 | Chadima et al. | 235/462 |
| 4,335,302 | 6/1982 | Robillard | 235/462 |
| 4,373,804 | 2/1983 | Pryor et al. | 356/376 |
| 4,542,528 | 9/1985 | Sanner et al. | 235/472 |
| 4,603,262 | 7/1986 | Eastman et al. | 235/472 |
| 4,758,716 | 7/1988 | Mayer et al. | 235/470 |
| 4,766,300 | 8/1988 | Chadima et al. | 235/472 |
| 4,877,949 | 10/1989 | Danielson et al. | 235/472 |

Primary Examiner—Stuart S. Levy
Assistant Examiner—Robert A. Weinhardt
Attorney, Agent, or Firm—Neuman, William, Anderson & Olson

[57] ABSTRACT

In a preferred arrangement, a lens system having circular symmetry in the hand-held reader focuses the entire width of area information onto an area photosensor array with a single flash of a ring-type xenon flash tube which surrounds the lens system and is symmetrically disposed relative to the axis of the lens system. In this way, the area information image can be disposed at any angle relative to the photosensor array, and the sensed information as stored in digital form can be rotated to a desired orientation prior to decoding.

5 Claims, 1 Drawing Sheet

HAND-HELD OPTICAL CHARACTER READER WITH MEANS FOR INSTANTANEOUSLY READING INFORMATION FROM A PREDETERMINED AREA AT AN OPTICAL SENSING AREA

BACKGROUND OF THE INVENTION

1. Hand-held optical character reading equipment that has been available in the past has not performed well. The reader must be positioned accurately during the entire movement across the label for a valid read to occur. Operators usually "scrub" the label with the reader rather than carefully aligning the reader on the label, and often give up and manually key the information into the terminal.

The primary reason that accurate alignment is required is that the reader uses either a linear matrix of sensing elements, say sixty-four, or a rectangular matrix of sensing elements, say fourteen by forty. The recognition algorithms typically used in these systems assume that the sensor is oriented accurately over or across the character to be read with a misalignment of less than seven degrees typically specified. The operator's guides for the present products instruct the operator to hold the reader exactly perpendicular, centered on the edge of the line to be read, not tilted, skewed, angled or rocked, and to hold this alignment during the sweep across the label. It is unsurprising that few operators use the readers in this way, and that poor read rates and dissatisfaction with the criticality of the reader alignment during scanning, have been serious problems.

2. To date, there doesn't appear to be an optical character reader (OCR) product available that realistically has the capability to be operated portably. Power consumption and circuit complexity seem to be the factors that have discouraged development in this area.

3. While there was significant competition between the use of bar code and OCR systems through the late 1970's, bar coding seems to have emerged as preferred technology. It is quite likely that the reason for this "win" is the poor performance of the available OCR equipment. If a very good, cost effective portable hand-held OCR reader were available, OCR might again become a contender for a significant share of this large market. The biggest factors in favor of an OCR system are that the label is directly human readable and the information density is high so that minimum label space is required for the information to be presented.

SUMMARY OF THE INVENTION

The biggest negatives surrounding the use of portable OCR systems have been the inherent weaknesses of the available hand-held scanner technology. The purpose of the described invention is to substantially improve the performance and capabilities of hand-held OCR scanners so that this inherently convenient coding method might once again become a viable alternative for automatic identification applications.

A basic concept of the invention is to provide a hand-held scanner which illuminates the entire width and height of a line or lines of characters on a label with a highly intense, short duration light pulse, focuses the reflected area image through an optical lens system onto an imaging device, and converts the sensed area signal to a digital signal which may be stored, manipulated and processed by logic circuits as a complete area image, to identify the information content.

In a preferred implementation of the hand-held area image scanner, the light source might be one or more xenon flash tubes arranged in a circumferential configuration to provide uniform illumination of the label surface. A lens system focuses an image of the entire label on the optical surface of the imaging device, preferably a solid state sensor of the charge coupled device type. With the proliferation of small, inexpensive consumer video cameras, very good, cost effective imaging devices of this type have become readily available. The output of the imaging device is converted to a digital signal which is interfaced to a digital processor for storage of the image pattern in memory. Once the information is contained in memory, processing and recognition algorithms may be performed "off-line" by the digital processor to rotate, normalize and enhance the image, remove "noise", and identify the coded information. A novel feature of this hand-held scanner is its ability to identify a broad set of optical information symbols including bar codes. Thus a hand-held reader may be configured that has the ability to read virtually any optically coded information the long standing problems with prior hand-held OCR systems.

According to a teaching of the present invention, a hand-held optical character reader has an area array of photosensor elements of size and resolution so as to register an entire line or multiple lines of characters at one time. Preferably, the entire field of characters on a label or the like is illuminated simultaneously by a brief flash of a highly intense light source. In a preferred implementation, a xenon flash tube of ring configuration surrounds the optical axis in the vicinity of a lens means which serves to focus the entire line or lines of characters onto a complete image sensor array.

Other objects, features and advantages of the invention will be apparent from the following detailed description taken in connection with the accompanying sheet of drawings, and from the individual features of the appended claims.

DETAILED DESCRIPTION

General Explanation of a Preferred Embodiment of the Invention

Figure 1:
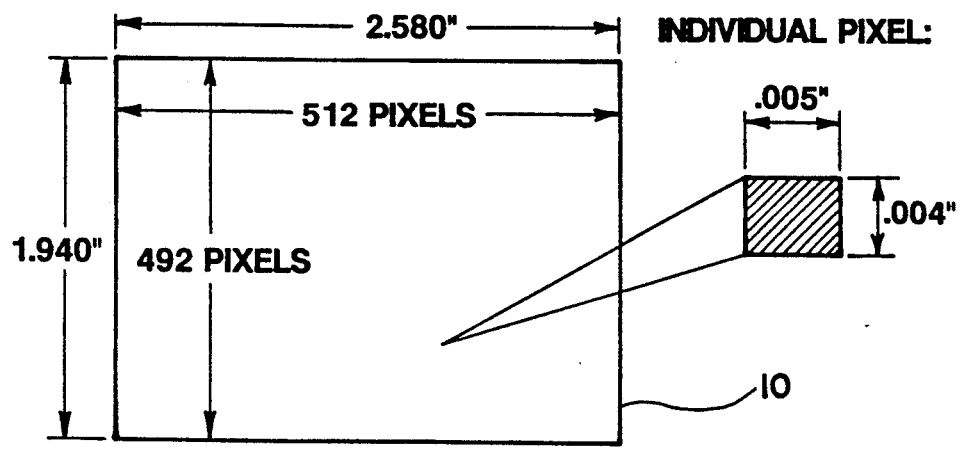
FIG. 1 is a diagram for illustrating the optical sensing area which results from the use of a typical solid state video imaging array and a lens system with a magnification ratio of ten to one, in a hand-held optical reader in accordance with the present invention.

In FIG. 1, an optical sensing area is delineated which represents the result of the use of a typical solid state video imaging array with a lens system that provides a magnification ratio of ten to one. The resultant active area is 2.58 inches × 1.94 inches as indicated.

Figure 2:
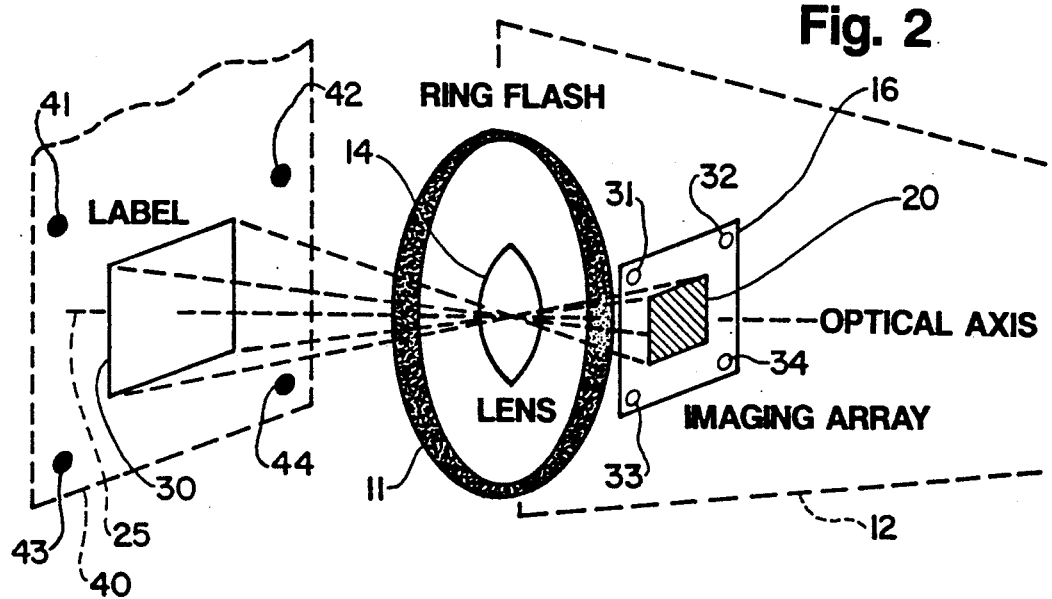
FIG. 2 is a diagrammatic illustration of a preferred form of hand-held optical reader according to the present invention, arranged so as to have its optical sensing area completely encompassing the machine-readable code (e.g. bar code) or human-readable information (e.g. line or lines of text) on a label so that a complete instantaneous optical image thereof is converted by the reader into digital image data and stored in a processor memory of the reader.

FIG. 2 shows a diagrammatic view of an optical system that incorporates the components described. The ring flash is a preferred light source for its ability to provide relatively uniform illumination with minimum backscatter into the imaging device. Also it may be "wrapped" around the lens, as shown, providing a compact, efficient package. The imaging array may be placed directly in line with the optical axis of the reader, so that the optical portion of a hand-held reader can be quite compact.

Operation of the reader consists of the user "aiming" at the target label as the area of information to be read and activating a switch to initiate the read. The flashtube is effective to provide an essentially instantaneous illumination, so movement of the hand-held reader during this time is noncritical. The digital processor immediately begins clocking the imaging array to read its contents which correspond to the intensity of the light from the active sensing area that was focused on the imaging array. The actual output of the imaging array is normally an analog signal. Since only white or dark information is needed, the conversion decision may consist of a comparator circuit with appropriately selected bandwidth and hysteresis to correspond to the characteristics of the imaging circuit output.

The digital information is assembled into sixteen bit data words corresponding to the word length of the digital processor and stored directly into the processor memory array. An entire image may consist of 492 lines of 512 samples each for a total 251,904 bits or 31,488 bytes of information, as illustrated in FIG. 1. Once the image acquisition process is complete, the digital processor may then begin operating on the image information to remove blemish and noise components, rotate the image to a normalized position, correct for optical skew due to curvature of the target label or reading from an off-axis angle, and the like to optimize the pattern recognition process. An important feature of the described system is the ability of the digital processor to detect during a "calibration mode" the locations of blemishes or flaws in the image sensing array and to store those locations in a non-volatile memory so that flawed image data may be masked or compensated to remove such errors from consideration in the recognition algorithms.

When image normalization is complete, the recognition process may then begin. The first level of recognition is to determine whether the coded information is a bar code or a line of characters, for example. If a bar code is recognized, standard bar code decode algorithms may be employed. If a character format is recognized, then a character recognition algorithm is invoked.

The digital processor employed for the image normalization, processing and recognition functions must be extremely fast and efficient for acceptable user satisfaction. A processor such as the Texas Instruments RMS320C25 type which is designed for digital signal processing applications has the ability to address external program and data memory, perform bit and word manipulations and has extremely fast execution speeds while operating with acceptable power consumption levels for a portable hand-held unit.

Specific Explanation of a Preferred Embodiment
(Referring by Reference Numerals to the
Diagrammatic Illustrations of FIGS. 1 and 2)

In FIG. 2, a hand-held area type optical character reader according to the present invention is illustrated for reading all the characters, bar codes or other information at an optical sensing area such as indicated at 10 in FIG. 1, essentially instantaneously. The area 10 to be read may be illuminated by a ring type flash illuminator 11, preferably a xenon flash tube. A hand-held scanner unit indicated by dash lines 12 may house light source 11, a lens 14 and a solid state area type photosensor array such as indicated at 16 with a density of photosensor elements to provide the resolution illustrated in FIG. 1, that is an individual pixel of 0.004 inch by 0.005 inch (four mils high by five mils wide).

Once the flash energization of the light source is complete, the photosensor array 16 may be read out, each line of photosensor elements of the array being shifted out serially for example, and the respective lines of photosensor elements being read out in parallel for example to an analog/logic interface component within the hand-held scanner unit 12. A signal processor in the scanner unit 12 and connected with the analog/logic interface component may receive the area image data and supply the raw area image data to an associated memory in the hand-held scanner unit 12 for subsequent processing in the hand-held unit, or the raw area image data (e.g. in digital form) may be coupled via an RF or optical link to a host processor for storage and processing. Such a separate host processor may also be portable and carried by the user. Where the focused information image e.g. at 20, FIG. 2, on the photosensor array 16 is tilted relative to the longitudinal (widthwise) axis of the array 16, the raw image data as stored in digital form may be subsequently processed so as to be rotated into a normal horizontal disposition prior to decoding thereof by well known algorithms. The flash tube 11 and lens 14 may have circular symmetry relative to their longitudinal axis 25 so that any angle of tilt of label 30 about axis 25 is not detrimental to uniform optical imaging of the entire information field.

Marker beams originating from light sources 31 to 34 at the four corners of area photosensor array 16 may be projected onto a supporting surface 40 carrying label 30, via optics 14, to produce marker spots 41-44, so that array 16 may be readily aligned relative to area information e.g. on label 30, as the hand-held unit 12 is being moved into proximity thereto. By way of example, photodiodes 31 to 34 at the four corners of the photosensor array 16 may be sequentially pulsed so that the marker spots 41-44 are each produced at a repetition rate of sixty per second when the hand-held scanner unit is placed in a target seeking mode. Once the four marker spots "bracket" the information to be read, as in FIG. 2, regardless of tilt, or regardless of whether the information extends horizontally or vertically, the light source 11 may be triggered, marker spots 41-44 being extinguished by this time, or the wavelength thereof being prevented from affecting the photosensor array by filtering, for example.

In a different embodiment, a complete label, e.g. five inches high by five inches wide, having a complete bar code, or row or rows of characters thereon, can be focused onto the operative area of a complete image photosensor array, such as 16, in response to a single essentially instantaneous flash of a light source, such as 11. In an advantageous embodiment, the height dimension of the complete image area array 16 may be such that a complete area information image including the entire area information width, e.g. of an eighty column line of characters, can be read whether the width of the information image is disposed widthwise or heightwise or diagonally on photosensor array 16. By way of example, a label 30 containing all its information in an area of square configuration 1.3 inches on a side could be disposed so that its width extended horizontally or vertically or at an acute angle on the photosensor array 16 and in each case the entire contents of the label could be read with a single flash of light source 11.

Preferably the hand-held unit 12 contains batteries with sufficient energy so as to supply the flashable light source means 11 and the other components of the hand-held unit, so that the unit is essentially self-contained and free of any connecting cable or the like.

The system of FIG. 2 may be provided with an autofocus ranging system so that the reader may have the ability to read at extended distances, e.g., up to twelve inches, and may also be capable of reading a wider range of target areas. Autofocus systems are common in 35 mm cameras.

The hand-held scanner unit 12 of FIG. 2 may contain the programming to recognize bar codes as well as e.g. conventional optical character fonts, and to automatically select the appropriate decoding algorithm from those available in its onboard memory. Furthermore, the hand-held unit 12 may contain an area array photosensor 16 of size and resolution so as to register multiple lines of characters, e.g., eight lines of eighty characters each at one time. Preferably, the entire information field to be scanned such as represented by label 30 in FIG. 2 is illuminated simultaneously by a brief flash of highly intense light source such as xenon tube 11.

The reading of bar codes with a complete area photosensor array such as 16, enables the digital data representing a bar code, for example, to be rotated and otherwise normalized as a complete entity prior to decoding, such that the normalized data may correspond to that obtained by sequentially scanning along a bar code parallel to the longitudinal bar code axis at a multiplicity of levels separated center to center e.g. by four mils. By combining the corresponding data points at different levels, e.g., on an averaging basis, defects in the bar code image can be reliably overcome such as defects due to foreign matter, spurious markings and the like. Again, the bar code can be at any random angle relative to the reader during the reading operation, speeding the reading of the labels, reducing operator fatigue and increasing the number of labels which can be read during a working day.

The ability to capture and manipulate an entire image with a portable unit has important benefits for optical character reading also. For example, it allows use of image enhancement algorithms, e.g., of the type developed for enhancement of deep space probe images, as well as image normalization, e.g., such as image rotation and scaling. Non-linear scaling for improving recognition efficiency with respect to irregular surfaces such as curved surfaces, and with respect to off-axis viewing angles, is also feasible.

It will be apparent that many modifications and variations may be effected without departing from the teachings and concepts of the present disclosure.

I claim as my invention:

1. A portable optical reader for reading information from a first information area having information therein comprising indicia, the first information area having a predetermined height and width and disposed on a support surface external of said reader, said reader comprising:
    a) an area array of photosensor elements disposed at the interior of said reader and having a selected height and width;
    b) optical means for focusing an image of the first information area onto said area array and having a longitudinal optical axis and circular symmetry relative to said longitudinal axis;
    c) marker source means for projecting multiple marker beams along said longitudinal axis onto the support surface and for producing multiple marker spots on the support surface, the multiple marker spots delineating on the support surface a perimeter of a predetermined second area having a predetermined height and width greater than the predetermined height and width of the first information area; and
    d) light source means for illuminating the support surface and at least the predetermined second area;
    e) when said portable reader is disposed relative to the support surface such that the perimeter of the predetermined second area encompasses the first information area, said optical means will focus an image of the first information area onto said area array, said height and width of said array selected such that when the perimeter of the predetermined second area encompasses the first information area, the entire image of the first information area can be focused widthwise or heightwise on said area array and in either case be read by said reader.

2. In a portable optical reader according to claim 1, wherein said light source means comprising flashable light source means in the form of a ring configuration surrounding said longitudinal optical axis.

3. In a portable optical reader according to claim 2, said flashable light source means being in the form of a ring-type xenon tube.

4. In a portable optical reader according to claim 1, said light source means comprising a ring-type xenon tube being symmetrically disposed relative to said longitudinal optical axis of said optical means and lying generally in the plane of said optical means.

5. In a portable optical reader according to claim 1, said optical means and said area array providing resolution of a substantial number of pixels in both horizontal and vertical directions with respect to area information being read.

* * * * *